US012671948B2

(12) United States Patent
Krieg

(10) Patent No.: US 12,671,948 B2
(45) Date of Patent: Jun. 30, 2026

(54) METHOD OF OPERATING A HEARING DEVICE SYSTEM, AND HEARING DEVICE SYSTEM

(71) Applicant: Sivantos Pte. Ltd., Singapore (SG)

(72) Inventor: Julius Krieg, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 245 days.

(21) Appl. No.: 18/651,977

(22) Filed: May 1, 2024

(65) Prior Publication Data

US 2025/0344027 A1 Nov. 6, 2025

(51) Int. Cl.
*H04R 25/00* (2006.01)

(52) U.S. Cl.
CPC .......... *H04R 25/505* (2013.01); *H04R 25/40* (2013.01)

(58) Field of Classification Search
CPC ..... H04R 25/505; H04R 25/40; H04R 25/558
See application file for complete search history.

(56) References Cited

U.S. PATENT DOCUMENTS

2012/0134521 A1 * 5/2012 Wessel .................. H04R 25/70
381/314

FOREIGN PATENT DOCUMENTS

CN 119325725 A * 1/2025 .......... H04R 25/505

* cited by examiner

*Primary Examiner* — Tuan D Nguyen
(74) *Attorney, Agent, or Firm* — Laurence A. Greenberg; Werner H. Stemer; Ralph E. Locher

(57) ABSTRACT

A method (32) for operating a hearing device system (2) containing a hearing device (4) that has a signal processing device (12) by way of which an output signal (24) is produced from an input signal (22) according to an n-dimensional parameter vector (26). The parameter vector (26) is restricted to a subspace (48) of the n-dimensional parameter space (40), the restriction being produced according to a behavior of a user. There is also described a hearing device system (2).

11 Claims, 2 Drawing Sheets

METHOD OF OPERATING A HEARING DEVICE SYSTEM, AND HEARING DEVICE SYSTEM

FIELD AND BACKGROUND OF THE INVENTION

The invention relates to a method for operating a hearing device system and to a hearing device system. The hearing device system comprises a hearing device containing a signal processing unit.

Individuals who suffer from a reduction in their hearing normally use a hearing aid, which is a hearing device. This usually involves using a microphone, that is to say an electromechanical sound transducer, to convert ambient sound into an electrical (audio/sound) signal, so that an input signal is provided. The input signal is processed by means of an amplifier circuit and introduced into the auditory canal of the person by means of a further electromechanical transducer in the form of a receiver. The captured input signal is moreover processed according to the reduction in the hearing, this normally being accomplished using a signal processing unit that the amplifier circuit may comprise.

The signal processing unit is normally adjusted in this case on the basis of a parameter vector, by means of which the individual functions of the signal processing unit are influenced. Such a parameter is for example a level of noise reduction or the width of a directional lobe, if the microphone is designed as a directional microphone. The parameter vector is usually predetermined by an audiologist and adjusted in particular on the basis of the needs of the user of the hearing device. Since the needs differ between different scenarios, every scenario has a corresponding associated parameter vector. As such, for example a scenario that is associated with conversation with individuals results in the directional characteristic of the microphone being different than for a scenario that is used when moving in road traffic.

In this case, however, it is also still possible for the parameters predetermined in each case to be regarded as less than optimum by the user. To allow further adjustment, it is known practice for the hearing device to be coupled for signal transfer purposes to a smartphone or the like on which an app is executed. The app can be used to change every parameter, and for example to manually adjust the directional characteristic, a gain, a compression or the like. This permits precise adjustment to the needs of the user. Such adjustment is comparatively unintuitive, however, and knowledge about the individual effects and the mutual influence is required in order for an acceptable result to be attained. This option is therefore usually not used by users, who accept reduced convenience due to the less than optimum setting. Alternatively, any shortcoming in the current settings is communicated to an audiologist during a visit, who then sets the parameter vector in a suitable manner. This may require repeated calls on the audiologist, which also reduces convenience.

SUMMARY OF THE INVENTION

The invention is based on the object of specifying a particularly suitable method for operating a hearing device system and a particularly suitable hearing device system, with in particular convenience being increased and/or adjustment being improved.

This object is achieved by the method as claimed and by the hearing device system as claimed. Advantageous developments and designs are the subject of the dependent claims.

The method is used for operating a hearing device system containing a hearing device. By way of example, the hearing device is an earphone or comprises an earphone, and the hearing device is for example a headset. Particularly preferably, however, the hearing device is a hearing aid. The hearing aid is used to assist a person suffering from a reduction in their hearing. In other words, the hearing aid is a medical device by means of which for example a partial hearing loss is compensated for. By way of example, the hearing aid is a receiver-in-the-canal (RIC) hearing aid, an in-the-ear hearing aid, an in-the-canal (ITC) hearing aid or a complete-in-canal (CIC) hearing aid, a pair of hearing aid spectacles or a pocket hearing aid. Alternatively, the hearing aid is a behind-the-ear hearing aid that is worn behind the pinna.

The hearing device is provided and configured to be worn on the human body. In other words, the hearing device preferably comprises a retaining apparatus by means of which it can be mounted on the human body. If the hearing device is a hearing aid, the hearing device is provided and configured to be arranged for example behind the ear or inside an auditory canal. In particular, the hearing device is wireless and provided and configured to be at least partially inserted into an auditory canal.

The hearing device preferably comprises a microphone that is used to capture sound. In particular, operation results in the microphone being used to capture ambient sound, that is to say sound waves, or at least a portion thereof. The microphone is conveniently arranged at least partially inside a housing of the hearing device and therefore at least partially protected. The microphone is appropriately an electromechanical sound transducer. The microphone has for example just a single microphone unit or multiple microphone units that interact with one another. Each of the microphone units conveniently has a diaphragm that is made to vibrate on the basis of sound waves, the vibrations being converted into an electrical signal by means of an appropriate recording device, such as a magnet that is moved in a coil. The microphone units are preferably of omnidirectional design.

It is appropriately possible in this case to use the microphone to produce or at least provide an input signal that is based on the sound striking the microphone, namely in particular the ambient sound. Alternatively or in combination, it is possible to use a different unit of the hearing device to provide the input signal. The different unit is for example a communication apparatus that meets a WLAN or Bluetooth standard, for example. In other words, the input signal is therefore transmitted wirelessly to the hearing device, in particular during operation. If the input signal can be provided by means of multiple units, a corresponding selector switch is appropriately present that is used to select the respective unit, so that only a single input signal is present during operation. The input signal is preferably an electrical signal that is, for example, of analog or preferably digital design.

The hearing device preferably has a receiver for outputting an output signal. The output signal in this case is in particular an electrical signal and, for example, of digital or appropriately analog design. The receiver is preferably an electromechanical sound transducer, for example a loudspeaker. Depending on the design of the hearing device, in the intended state the receiver is arranged at least partially inside an auditory canal of a user of the hearing device, that is to say a person, who is also referred to as the wearer or hearing device wearer, or at least acoustically connected thereto. The hearing device is used in particular primarily to output the output signal by means of the receiver, with corresponding sound being produced. In other words, the main function of the hearing device is preferably to output the output signal.

The hearing device further comprises a signal processing unit by means of which the microphone and the receiver are preferably connected for signal transfer purposes. The hearing device conveniently has a signal processor that for example forms the signal processing unit or at least is a component part thereof. The signal processor is for example a digital signal processor (DSP) or implemented by means of analog components. The signal processor or at least the signal processing unit is used in particular to produce the output signal from the input signal. The signal processing unit is at least suitable, in particular provided and configured, for this purpose. If the signal processor is designed as a digital signal processor, an A/D converter is conveniently arranged between the microphone and the signal processing unit, for example the signal processor. Particularly preferably, the hearing device additionally comprises an amplifier, or at least part of the amplifier is formed by means of the signal processing unit. By way of example, the amplifier is connected upstream or downstream of the signal processor for signal transfer purposes.

The signal processing device is set by means of an n-dimensional parameter vector, so that the output signal is produced from the input signal according to the n-dimensional parameter vector. The parameter vector therefore has n different parameters, n being an integer and greater than or equal to 2, and each parameter being used to adjust the way in which the signal processing device works. Each parameter is used in particular to predetermine a way in which the output signal is produced from the input signal and in particular to select a specific function or a setting for the function, on the basis of which production takes place.

One applicable parameter is for example a gain characteristic or a characteristic of a signal amplitude, these being predetermined for example for all frequencies or for specific/individual frequencies. Another parameter is for example the selection and/or level of a signal processing algorithm. Another parameter is for example the setting of a frequency response characteristic, a compression characteristic and/or for example a position of a knee.

Alternatively or in combination, the (at least some) parameters are used to predetermine specific coefficients of one or more signal process processing algorithms. At least one of the parameters is preferably used to predetermine a directional characteristic. Alternatively or in combination, one parameter is used to set a noise reduction unit of the signal processing device, for example the intensity thereof. Alternatively or in combination, at least one of the parameters is used to set a focus on speech. In summary, the parameter vector therefore denotes a specific point in the n-dimensional parameter space. Owing to the use of the parameter vector, it is therefore possible to use the hearing device for a wide variety of users who have a wide variety of needs. Adjustment is accomplished merely by suitably selecting the parameter vector, the hardware being left unaltered.

The parameter vector is restricted to a subspace of the n-dimensional parameter space. In other words, it is not possible to use all possible points in the parameter space, but rather only those that are situated in the subspace. The number of possible usable parameter vectors is therefore reduced. At least one of the parameters is preferably predetermined, or at least the choice thereof is restricted, according to a different parameter. The subspace is in particular a space derived from the n-dimensional parameter space, but is conveniently not limited to a (mathematical) subvector space. The subspace is appropriately obtained from the n-dimensional parameter space on the basis of a mapping, with for example fewer parameters being present, or at least a dimensionality being reduced.

The parameter space is restricted to the subspace, which is in particular likewise n-dimensional, according to a behavior of the user. In other words, the behavior of the user is monitored and taken as a basis for predetermining the possible parameter vectors. Consequently, the subspace is altered in the case of users who behave differently, even if they have the same needs otherwise. In particular, it is possible for users to select the parameter vector from the subspace, for example by means of an appropriate manual selection and/or when performing another desired activity, so that the signal processing device is subsequently operated in accordance with the parameter vector. Alternatively or in combination, for example the parameter vector is selected automatically, for example when certain conditions prevail.

Due to the restriction, the user needs only reduced knowledge about the design of the signal processing device and the individual effects and consequences of changing the parameters, which increases convenience. In other words, the complexity of setting the signal processing device is reduced for the user. This also prevents the user from using a parameter vector that leads to unsatisfactory results. The restriction according to the behavior of the user ensures that parameter vectors requested or desired by the user are available, and so the output signal is also produced from the input signal according to the needs of the user. In summary, the reduced complexity increases convenience for the user during operation of the hearing device system. It is possible to match the hearing device system to the needs of the user, which is why adjustment is improved.

By way of example, the hearing device system is formed only by means of the hearing device. Alternatively, the hearing device system comprises two hearing devices, for example, which are of identical design to one another, for example, and which are operated accordingly. At least each hearing device preferably has an associated signal processing device that is operated in accordance with the selected parameter vector. Alternatively, the two hearing devices are different. In another alternative, an additional device is present as an alternative or in combination with this, but it is not a hearing device.

The hearing device system preferably has a further setting, such as unlock, by means of which for example the restriction to the subspace can be lifted. If the user thus has a comparatively high level of knowledge about the way in which the signal processing device works, they can therefore perform precise manual adjustment in a purposeful manner. For example, all parameters can be freely adjusted accordingly. Alternatively, this is possible only for certain parameters, for example. In another alternative, no lifting of the restriction is possible, for example.

By way of example, the subspace is likewise n-dimensional. In this case, however, the number of values or at least the range that each or some of the parameters can occupy is reduced. The restriction preferably means that the dimensionality is reduced. The subspace chosen is appropriately a trajectory in the (original) n-dimensional parameter space. The subspace is thus in merely one-dimensional form. The parameter vector is therefore selected by selecting the position along the trajectory, thereby reducing complexity further and increasing convenience.

By way of example, the parameter vector is predetermined automatically, for example according to current requirements/a current situation. However, it is particularly preferably possible to select the parameter vector manually. A slide control, which is in particular in the form of a kind of slider, is appropriately used for this purpose. This will permit comparatively simple and intuitive selection of the parameter vector from the subspace. The subspace is preferably designed as a trajectory and therefore of one-dimensional design. Consequently, it is possible to use the slide control to specify the parameter vector to be used comparatively precisely, thereby facilitating operation.

By way of example, the slide control is of one-dimensional design, or for example two-dimensional or multidimensional. This permits improved adjustment, and it is possible to use a two-dimensional or multidimensional subspace, thereby improving adjustment. However, this increases the complexity, at least slightly. Alternatively, the slide control is of one-dimensional design, and there is a second slide control if the subspace is of at least two-dimensional design. In particular the value range of the second slide control is predetermined according to the production of the first slide control. The second slide control permits comparatively precise adjustment, complexity being reduced in comparison with the two-dimensional slide control.

By way of example, the hearing device has the slide control, which has been inserted into the housing, for example. Manual operation of the slide control, which is designed in the style of a rotary wheel or a longitudinally adjustable head, for example, is used to select the parameter vector in this case. The slide control is particularly preferably shown on a display of a portable device that is coupled to the hearing device for signal transfer purposes. The portable device is a component part of the hearing device system in this case, and the portable device is preferably coupled to the hearing device by means of the possible communication apparatus. Appropriately, the hearing device and the portable device of the hearing device system are connected to one another by means of a Bluetooth or WLAN connection for signal transfer purposes. The display is conveniently of touch-sensitive design, and so the display can also be used to alter the setting of the slide control shown. Intuitive operation is therefore permitted, and for example it is also possible to provide the user with information relating to the different settings of the slide control, thereby increasing convenience.

The portable device is, for example, a smartphone or other wearable, for example a smartwatch. The slide control is appropriately shown as part of an app that is executed by means of the portable device. In this case, the app can moreover be used for example to change other settings of the hearing device. By way of example, it is also possible, at least if the possible unlock has taken place, to change all parameters, with in particular the restriction to the subspace being able to be lifted. If the user has set about the hearing device and/or the signal processing device comparatively precisely, comparatively precise setting is therefore possible.

By way of example, all parameter vectors of the subspace are precisely defined and predetermined. However, a number of discrete points that have been taken as a basis for generating the subspace are particularly preferably present. In other words, the discrete points have been taken as a basis for predetermining the subspace, the subspace having a greater number of parameter vectors, for example. The discrete points mean that creation of the subspace is facilitated.

Comparatively intuitive understanding is also permitted, in particular if the discrete points are suitably chosen.

By way of example, the subspace is formed only by means of the discrete points. It is therefore only possible to select the discrete points as parameter vectors, in particular by means of the possible slide control. However, the subspace is particular preferably enlarged, and for example each of the discrete points has a sphere formed around it, said spheres forming the subspace. The spheres are spaced apart from one another, for example. However, the subspace between two, preferably adjacent, discrete points is particularly preferably determined by means of a straight line running therebetween. The two discrete points are situated on the straight line. The subspace is therefore determined in particular on the basis of multiple straight lines. By way of example, the subspace is predetermined by means of the respective straight line between the respective discrete points, or at least around a multidimensional tube formed around the straight line. A shift in the parameter vector between two adjacent discrete points thus results in particular in a linear scaling of the individual parameters between the applicable instances of the two discrete points. Comparatively simple and time-saving ascertainment of the subspace or at least of the parameter vector is therefore possible. Alternatively, instead of the straight lines, a spline or other curve is used. There is thus a reduction in the formation of discontinuities or the like that could lead to a sudden change in the behavior of the signal processing device during adjustment of the parameter vector subspace.

By way of example, the discrete points are predetermined in essentially arbitrary fashion. However, the discrete points used are particularly preferably acoustic scenarios predetermined by the manufacturer, which are detected by means of a classifier, for example, during operation. Alternatively, the acoustic scenarios are created during operation of the hearing device system. At least preferably, not all possible acoustic scenarios are used as discrete points, but rather only those that the user was in. In this way, appropriately, the subspace is restricted according to the behavior of the user. This is conveniently accomplished by analysing the behavior of the user, and thus determining the acoustic scenarios typical of the daily life of the user. This is equally carried out by means of an external server, and for example "Monte Carlo" methods are used for ascertainment. Alternatively, or in combination, a multiplicity of different audio signals, captured in particular by means of the microphone, are evaluated. The audio signals used are appropriately the input signals, which are thus also taken as a basis for determining the acoustic scenarios. For example, the portable device, which is in particular the smartphone, is present in this case. The portable device can conveniently be used by the user to make an input for each acoustic scenario and in particular to perform naming. The slide control used to select the parameter set is preferably present. In particular, it is possible to use the slide control to select one of multiple acoustic scenarios, leading to further intuitive operation.

By way of example, the discrete points are arranged essentially arbitrarily to define the subspace, without being such that adjacent discrete points differ only slightly. However, the discrete points are particularly preferably arranged according to the change between the acoustic scenarios. Discrete points for acoustic scenarios between which the user changes comparatively often are thus adjacent to one another, whereas acoustic scenarios between which a direct change is not possible or at least has not occurred are preferably spaced apart from one another by at least one further discrete point. If for example the respective acoustic situation to be used is selected automatically, the discrete points predetermine the extent to which the parameter vector can be changed, with the result that an incorrect classification is prevented or at least rather improbable. Even if the parameter vector is selected by means of the slide control, said slide control is thus moved along the discrete points in the order in which the user also moves between the acoustic scenarios. As such, after a scenario corresponding to a sports activity in a fitness studio, for example, it would initially be possible to select a scenario that corresponds to movement and/or participation in road traffic as adjacent discrete points. By contrast, a discrete point corresponding to an office activity would be able to be selected only afterwards and not directly after the sports activity.

Alternatively, or in combination, the discrete points are created by checking a manual setting of the parameters. In this case, the portable device that can be used to set the respective parameters of the parameter vector that is to be used is appropriately present. By way of example, the restriction to the subspace is not yet present in this case. The applicable settings are conveniently captured for a specific period of time, for example a few days or weeks. Appropriately, it is then checked which parameters are changed together. A cluster analysis is preferably used for this purpose.

In summary, the behavior of the user is thus recorded and evaluated/analysed, namely how it alters the parameters. In particular, for example, tuples of parameters that are often altered together are ascertained in this case. If two parameters that are always altered together are identified, the subspace is restricted accordingly, said subspace being taken as a basis for predetermining one of the discrete points, for example. In summary, the change of one of the parameters by the user thus also results in the other parameter being altered, this occurring suddenly, proportionally, indirectly proportionally or in non-analytically describable fashion, for example. Conveniently, the parameters that are used are ascertained by using an optimization algorithm. In this case, the cost function used is for example merely the frequency with which certain parameters are altered together, the relative changes moreover conveniently also being taken into consideration. This admittedly requires the user to have knowledge about the behavior of the signal processing device for different parameters, or this is accomplished by means of trial and error. When this has been done once, however, the method subsequently facilitates selection of the parameter vector, for which purpose in particular the slide control is used. In this case, the subspace is conveniently merely one-dimensional and therefore a trajectory. In one development, the cost function is used to take account of acoustic scenarios. In this way, in particular every setting of the possible slide control thus corresponds to a specific acoustic scenario that has a significance, at least for the user.

By way of example, the subspace is created continuously or at specific discrete times. By way of example, the same subspace is adjusted in each case, or new subspaces are created in each case. In particular, each subspace has a corresponding associated possible slide control in this instance.

Creation of the subspace, in particular restriction of the parameter space, is preferably followed by a notification being output. This is done audibly, for example, in particular by adapting the output signal accordingly. Alternatively or in combination, the notification is output visually on the possible portable device. The user thus in particular becomes aware that the possible slide control is present, which means that the user can now use it to set the hearing device.

The hearing device system comprises a hearing device. By way of example, the hearing device is a headset or particularly preferably a hearing aid. For example, the hearing aid is a receiver-in-the-canal (RIC) hearing aid, an in-the-ear hearing aid, an in-the-canal (ITC) hearing aid or a complete-in-canal (CIC) hearing aid, a pair of hearing aid spectacles or a pocket hearing aid. Alternatively, the hearing aid is a behind-the-ear hearing aid that is worn behind the pinna.

The hearing device comprises a signal processing device. The hearing device preferably comprises a microphone and a receiver that are connected by means of the signal processing device for signal transfer purposes. The hearing device is operated using a method in which the signal processing device is used to produce an output signal from an input signal according to an n-dimensional parameter vector. The parameter vector is restricted to a subspace of the n-dimensional parameter space, the restriction being produced according to a behavior of a user.

By way of example, at least part of the method is carried out by means of the signal processing device. The signal processing device is thus suitable, in particular provided and configured, to carry out at least part of the method.

The developments and advantages outlined in connection with the method can also apply, mutatis mutandis, to the hearing device system, and vice versa.

BRIEF DESCRIPTION OF THE FIGURES

An exemplary embodiment of the invention is explained in more detail below with reference to a drawing, in which.

Mutually corresponding parts are provided with the same reference signs throughout the figures.

DETAILED DESCRIPTION OF THE INVENTION

Figure 1:
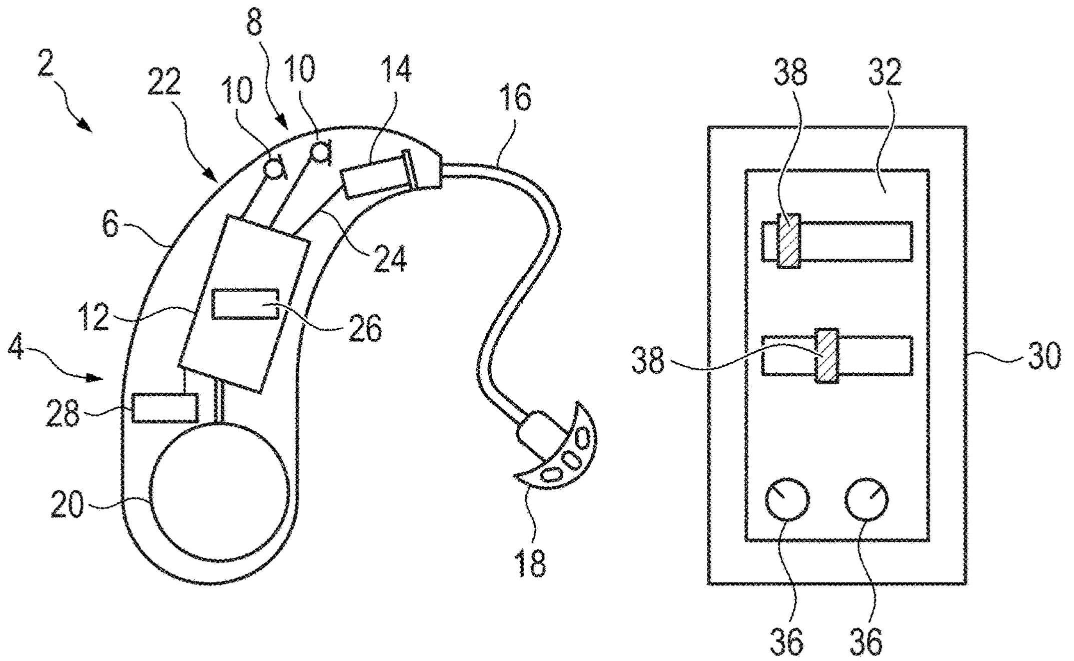
FIG. 1 schematically shows a hearing device system containing a hearing device and a portable device.

FIG. 1 schematically shows a hearing device system 2 containing a hearing device 4 in the form of a hearing aid that is provided and configured to be worn behind an ear of a wearer (user, hearing device wearer, beneficiary). In other words, it is a behind-the-ear hearing aid. The hearing device 4 comprises a housing 6 manufactured from a plastic. Arranged within the housing 6 is a microphone 8 containing two microphone units 10, each in the form of an electromechanical sound transducer, which are of omnidirectional design. Altering a temporal offset between the audible signals captured by means of the omnidirectional microphone units 10 permits a directional characteristic of the microphone 8 to be altered, with the result that a directional microphone is obtained.

The two microphone units 10, that is to say the microphone 8, are coupled for signal transfer purposes to a signal processing device 12 that comprises an amplifier circuit, not shown in more detail, and a signal processor. The signal processing unit 12 is furthermore formed by means of circuit elements, for example electrical and/or electronic components. The signal processor is a digital signal processor (DSP) and connected to the microphone units 10 via an A/D converter, not shown in more detail, for signal transfer purposes.

The signal processing device 12, which is also referred to as a signal processing unit, has a receiver 14 coupled to it for signal transfer purposes. The microphone 8 and the receiver 14 are therefore connected by means of the signal processing unit 12 for signal transfer purposes. The receiver 14, which is an electromechanical sound transducer, is used during operation to convert an (electrical) signal provided by means of the signal processing unit 12 into sound waves. These are introduced into a sound tube 16, one end of which is attached to the housing 6. The other end of the sound tube 16 is enclosed by means of a dome 18, which in the intended state is arranged in an outer ear canal of a user of the hearing device system 2, that is to say the wearer of the hearing device 2.

The hearing device 4 has a battery 20 that is arranged in the housing 6 and by means of which the signal processing device 12 is supplied with current. During operation of the hearing device 4, the microphone 8 is used to provide an input signal 22 that has two components. Each component is associated with one of the microphone units 10 and corresponds to the sound striking said microphone unit. The input signal 22 is routed to the signal processing device 12, and said signal processing device is used to take the input signal 22 and to produce an output signal 24 that is routed to the receiver 14, with the result that the output signal 24 is taken as a basis for producing the sound introduced into the sound tube 16. The input signal 22 and the output signal 24 are electrical signals, and the output signal 24 is produced from the input signal 22 on the basis of a parameter vector 26, which is n-dimensional. The parameter vector 26 therefore has n different parameters in total that are taken as a basis for producing the output signal 24. One of the parameters in this case is for example the time offset between the two components of the input signal 22 that are provided by means of the microphone unit 10, that is to say the level of the directional characteristic of the microphone 8. Other parameters are for example the gain at individual frequencies and/or a level of noise reduction.

The hearing device 6 furthermore comprises a communication apparatus 28 that meets the Bluetooth standard and by means of which the hearing device 4 is connected and therefore coupled to a (further) portable device 30 for signal transfer purposes. The portable device is a smartphone and, in the housing, which is not otherwise denoted, has a communication apparatus in appropriate form and also microprocessors. The portable device 30 also comprises a display 32 that is used to visually output notifications/information.

Figure 2:
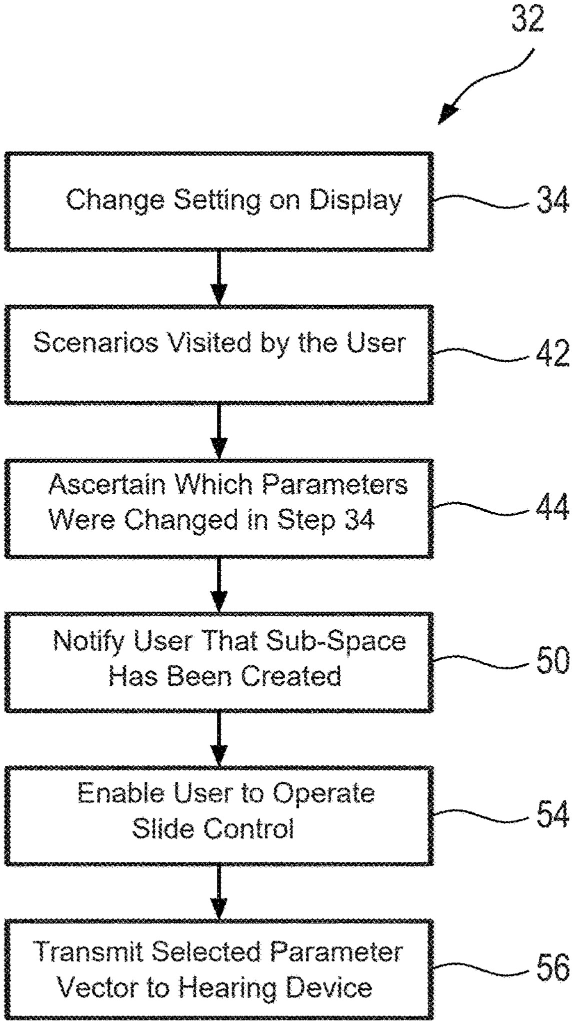
FIG. 2 shows a method for operating the hearing device system.

FIG. 2 shows a method 32 for operating the hearing device system 2. Said method involves using the microphone 8 to produce the input signal 22, which is processed in accordance with the predetermined parameter vector 26 by means of the signal processing device 12, with the result that the output signal 24 is produced. This is routed to the receiver 14.

Should the user be unhappy with the setting of the signal processing device 12, that is to say the output signal 24, they are able, in a first work step 34, to use an appropriate input on the display 32 to change a setting. To this end, rotary controls 36 and slide controls 38 shown on the display 32 can be operated in an appropriate manner and value inputs can be entered into applicable fields. Each rotary control 36, slide control 38 and field has an associated parameter, and so the input is used to select a new parameter vector 26. The changed parameter vector 26 is transmitted to the hearing device 4, and the signal processing device 12 is operated by means of said parameter vector. There are essentially no restrictions for the parameters in this case, which means that the resulting parameter vector 26 can adopt essentially any point within the n-dimensional parameter space 40 shown in FIG. 3. To simplify the representation, the parameter space 40 is of merely three-dimensional design. Any change in the parameters and also the time and the extent of the change are recorded and stored in a memory, not shown in more detail, of the portable device 30.

In a second work step 42, which takes place at the same time as the first work step 34 and, just like that one, lasts two weeks, it is ascertained what acoustic scenarios the user of the hearing device system 2 visits. To this end, the input signal 22 is taken as a basis for performing classification and thus ascertaining the respective acoustic scenario. It is moreover ascertained how the change between the acoustic scenarios takes place, that is to say after what acoustic scenario what other acoustic scenario occurs. The acoustic scenarios and also the change are stored in the memory, not shown in more detail, of the portable device 30.

After the two weeks, a third work step 44 is used to ascertain which parameters have been collectively changed on the basis of the manual setting in the first work step 34. The extent to which these individual parameters have been changed is also taken into account in this step. In particular, tuples that describe the collectively changed parameters, and which also have an associated acoustic scenario, are thus ascertained. These are verified on the basis of the ascertained acoustic scenarios that the user was in, as recorded in the second work step 42.

Figure 3:
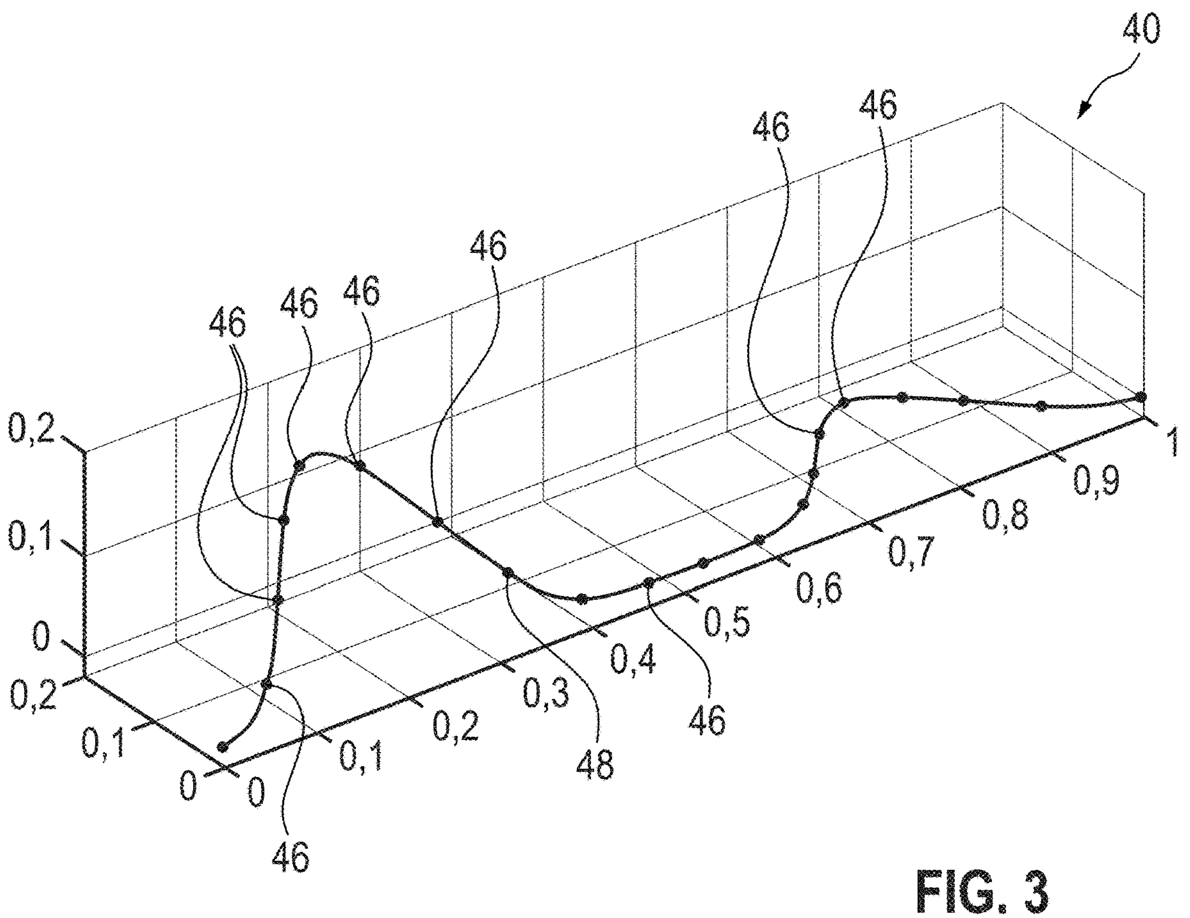
FIG. 3 shows the n-dimensional parameter space with a subspace, and FIG. 4 schematically shows the portable device when the method is carried out.

The acoustic scenarios are each used to determine a discrete point 46, that is to say a respective parameter vector 26, in the parameter space 40, as shown in FIG. 3. Each of the discrete points 46 in this case has an associated one of the acoustic scenarios that the user was in within the previous two weeks. The discrete points 46 associated with acoustic scenarios between which the user has changed directly are arranged next one another, whereas the discrete points 46 associated with the acoustic scenarios between which there has been no direct change by the user are not directly next to one another.

The discrete point 46 is taken as a basis for generating a subspace 48 that is situated in the parameter space 40. The subspace 48 has the straight runs between respectively adjacent discrete points 46, and is formed on the basis of these sections and also the individual discrete points 46. The subspace 48 is therefore a trajectory, namely a line that has the straight sections. In summary, the subspace 48 is one-dimensional and determined on the basis of the discrete point 46 and also the straight lines running between two adjacent instances of the discrete point 46. The straight lines run through the respectively associated discrete points 46. Due to the ascertainment, each of the discrete points 46 corresponds to one of the acoustic scenarios that the user was in, and the discrete point 46 is arranged according to the change between the acoustic scenarios. The discrete points 46 on the basis of which the subspace 48 is defined are also produced by checking the manual setting of the parameters.

Figure 4:
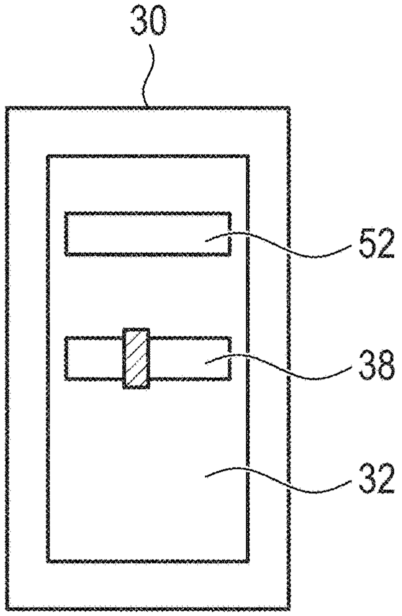

In a subsequent fourth work step 50, a notification 52 is output on the display 32, as shown in FIG. 4. The user is thus informed that the subspace 48 has been created. Creation of the subspace 48 is therefore followed by the notification 52 being output. Also, only a single slide control 38 is now shown on the display 32. The rotary controls 46, the input fields and other slide controls 38 are no longer displayed and are not selectable. In summary, the slide control 38 is shown on the display 32 of the portable device 30 coupled to the hearing device 4 for signal transfer purposes.

In a subsequent fifth work step 54, the user is merely able to operate the slide control 38. When the slide control 38 is moved, one of the parameter vectors 26 from the subspace 48 is selected in this case, each position of the slide control 38 corresponding to a parameter vector 26 defined by means of the subspace 48. In other words, movement of the slide control 38 results in the parameter vector 26 being moved along the trajectory forming the subspace 48.

The parameter vector 26 is thus restricted to the one-dimensional subspace 48 of the three-dimensional parameter space 40, the restriction having been produced according to the behavior of the user, namely according to the manual setting of the parameters during the first work step 34 and also the acoustic scenarios that the user was in, and that were ascertained in the second work step 42. In other words, in the fifth work step 54, the parameter vector 26 is restricted to the subspace 48, and the parameter vector 26 is selected from the subspace 48 according to the setting of the slide control 38.

In a subsequent sixth work step 56, the selected parameter vector 26 is transmitted to the hearing device 4 and the signal processing device 12 is subsequently operated on the basis thereof. The signal processing device 12 is thus subsequently used to produce the output signal 24 from the input signal 22 according to the parameter vector 26 that is within the subspace 48.

The invention is not limited to the exemplary embodiment described above. On the contrary, other variants of the invention can also be derived therefrom by a person skilled in the art without departing from the subject matter of the invention. In particular, all of the individual features described in connection with the exemplary embodiment can furthermore also be combined with one another in another way without departing from the subject matter of the invention.

LIST OF REFERENCE SIGNS

2 hearing device system
4 hearing device
6 housing
8 microphone
10 microphone unit
12 signal processing device
14 receiver
16 sound tube
18 dome
20 battery
22 input signal
24 output signal
26 parameter vector
28 communication apparatus
30 portable device
32 method
34 first work step
36 rotary control
38 slide control
40 parameter space
42 second work step
44 third work step
46 discrete point
48 subspace
50 fourth work step
52 notification
54 fifth work step
56 sixth work step

The invention claimed is:

1. A method for operating a hearing device system containing a hearing device with a signal processing device, the method comprising:

receiving an input signal and producing from the input signal an output signal by the signal processing device based on an n-dimensional parameter vector;

the n-dimensional parameter vector being restricted to a subspace of an n-dimensional parameter space, and a restriction of the n-dimensional parameter vector being produced in dependence on a behavior of a user of the hearing device.

2. The method according to claim 1, which comprises choosing a trajectory as the subspace.

3. The method according to claim 1, which comprises selecting the parameter vector from the subspace according to a setting of a slide control.

4. The method according to claim 3, which comprises displaying the slide control on a display of a portable device that is coupled to the hearing device for signal transfer.

5. The method according to claim 1, which comprises generating the subspace on a basis of multiple discrete points.

6. The method according to claim 5, which comprises determining the subspace between two discrete points by way of a straight line running between the discrete points.

7. The method according to claim 5, wherein a discrete point used in each case is an acoustic scenario having been experienced by the user.

8. The method according to claim 7, wherein the discrete points are arranged according to a change between respective acoustic scenarios.

9. The method according to claim 5, which comprises creating the discrete points by checking a manual setting of the parameters.

10. The method according to claim 1, which comprises outputting a notification after creating the subspace.

11. A hearing device system, comprising:

a hearing device containing a signal processor configured to be operated with the method according to claim 1.

* * * * *